March 7, 1961 A. N. AZELICKIS 2,974,290

V.H.F. TELEVISION AMPLIFIER CIRCUIT

Filed Sept. 4, 1958 3 Sheets-Sheet 1

INVENTOR.
Alexis N. Azelickis,
BY Robert L. Kahn
Attorney.

March 7, 1961 A. N. AZELICKIS 2,974,290

V.H.F. TELEVISION AMPLIFIER CIRCUIT

Filed Sept. 4, 1958 3 Sheets-Sheet 2

INVENTOR.

Alexis N. Azelickis,

BY Robert L. Kahn

Attorney.

March 7, 1961 A. N. AZELICKIS 2,974,290

V.H.F. TELEVISION AMPLIFIER CIRCUIT

Filed Sept. 4, 1958 3 Sheets-Sheet 3

INVENTOR.
Alexis N. Azelickis,
BY Robert L. Kahn
Attorney.

United States Patent Office 2,974,290

Patented Mar. 7, 1961

2,974,290

V.H.F. TELEVISION AMPLIFIER CIRCUIT

Alexis N. Azelickis, Chicago, Ill., assignor to Oak Manufacturing Co., a corporation of Delaware Filed Sept. 4, 1958, Ser. No. 759,090

1 Claim. (Cl. 330—70)

This invention relates to a V.H.F. television amplifier circuit, and in particular to a circuit network for connecting a pair of vacuum tubes disposed in cascode relation.

It is well known that two tubes may be arranged to function in a cascode circuit by having the cathode of one tube grounded and having the grid of the next tube grounded insofar as signal potentials are concerned. The advantages of such a circuit are well known and need not be dwelt upon. As a rule, the input circuit to the first tube, this being the circuit connected to the control grid and cathode, has manually tunable circuit means for selecting a desired channel in the V.H.F. band. Similarly, the output circuit of the second tube has manually tunable circuit means for selecting a desired V.H.F. channel. It is understood that both manually tunable circuit means in the input and output of the entire cascode system are operated simultaneously to work together for selecting a desired channel.

The V.H.F. range of frequencies embracing channels 2 to 13 inclusive covers a range of from 54 to 88 megacycles (channels 2 to 6 inclusive) and from 174 to 216 megacycles (channel 7 to 13 inclusive). The gap between channels 6 and 7 is unimportant insofar as tuner response is concerned. However, over the entire range from channels 2 to 13 inclusive it is desirable to have satisfactory gain and selectivity. Because of the great range of frequencies embraced in the V.H.F. band, it is difficult for a simple resonant circuit to maintain a substantially constant response characteristic. Hence, in a cascode system it is desirable to provide some auxiliary resonant circuits for supplementing the response of the circuits. These supplementary resonant circuits are not manually tunable but adapt themselves to various frequencies as selected by manual tuning to provide increased gain when desired.

Cascode circuits in use generally do not endow the entire V.H.F. amplifier system with uniform gain over all the channels in the V.H.F. band. Such cascode circuits as are presently known have a tendency to accentuate the low end of the entire V.H.F. band. Such circuits in combination with the tuners tend to provide less gain at the high frequency end of the V.H.F. band and particularly channels 7 to 13 inclusive. The reduction in gain also impairs the signal to noise ratio and consequently reduces the quality of output.

In accordance with the present invention, I provide a network having a number of network components which cooperate in one manner at the low band portion and in a different manner at the high band portion of the V.H.F. band. By low band portion is meant channels 2 to 6 inclusive and by high band portion is meant channels 7 to 13 inclusive. The rearrangement and variation in cooperation between the network components is accomplished by the inherent response of such components to various frequencies and not by any manual adjustment or change. By a suitable selection of circuit components and by suitable arrangement of such components, the variation in frequency response may effectively provide two different equivalent antiresonant (shunt tuned) circuits with two resonance frequencies, one in the low, the other in the high television band.

As is well known, an equivalent circuit represents the electrical equivalent of a circuit at a particular frequency or under a particular set of conditions. The gap between the two frequency band portions is utilized to insure a complete and definite transition of the actual circuit from one equivalent circuit to a different equivalent circuit.

The variation in reactance of inductors and capacitors is substantially continuous with variation in frequency. Hence, if it were not for the gap between the two band portions of the V.H.F. band, a circuit embodying the present invention could not be fully represented by two definite equivalent circuits. Instead, if a frequency gap were not present, the new circuit embodying the present invention would be represented by one equivalent circuit at the low end, a different equivalent circuit at the high end and additional equivalent circuits resulting from a gradual change from one to the other in the frequencies between the two band portions.

The invention generally is characterized by providing a pair of series connected inductors between the anode and cathode of the two cascode connected tubes, said inductors being so poled and being electromagnetically coupled as to provide for a series aiding action. Supplementing the inductors is a suitable capacitor connected at a suitable point to the inductors, said capacitor being so connected that at low channels 2 to 6 inclusive, the by-pass action of said capacitor may be disregarded. It is believed that the frequency response of the inductors is such that for the lower channels 2 to 6 inclusive, a simple PI network may be considered as existing whereas for the higher channels 7 to 13 inclusive another PI network may be considered as existing.

In order that the invention may be fully understood, reference will now be made to the drawings.

Figure 1 shows in diagrammatic form a cascode circuit embodying the present invention.

Figures 2*a* and 2*b* show respectively in simplified form equivalent circuits for the low and high band portions.

Figure 3 illustrates a transformer construction used with the circuit illustrated in Figure 1.

Figure 3*a* shows the transformer wiring.

Figures 4 to 6 inclusive illustrate some characteristic curves showing network response at various frequencies.

Figures 7 to 12 inclusive show channel responses of a cascode input circuit and the new coupling network in a typical television tuner.

Referring first to Figure 1, vacuum tubes 10 and 11 are illustrated as being of the three element variety connected in cascode relation. Vacuum tube 10 has cathode 12 grounded and has control grid 14 connected to a suitable source 15 of signals. This may be an antenna system. Connected across the input circuit of vacuum tube 10 is input impedance 16, this being part of a tuner for selecting a desired channel in a V.H.F. television band. While source 15 is shown as having one line, with ground return, it is possible to have the usual 300 ohm balanced line from a TV antenna. Inasmuch as the input connections to tube 10 are well known, no detailed showing is required.

Vacuum tube 10 has anode 20 connected to terminal 21 of primary 22 of transformer 23. Transformer primary 22 has its low potential terminal 24 connected to ground through coupling capacitor 26.

Low potential terminal 24 is the terminal for secondary winding 28 of transformer 23. Secondary 28 has its high potential terminal 30 connected to cathode 31 of vacuum tube 11. Cathode 31 has input tube capacitance 33 existing between the cathode and ground. Vacuum tube 11 has anode 35 connected by wire 36 to terminal 37.

Vacuum tube 11 has control grid 39 connected by lead 40 going to terminal 41. Lead 40 is connected to one terminal of grounded by-pass capacitor 42. Terminal 41 is on a voltage divider network consisting of grounded resistor 44 and resistor 45 connected to B+ supply terminal 46. Between terminals 37 and 46 is connected an output load 48 which forms part of a tuner. Impedances 16 and 48 may be manually operated together to select a desired TV channel. Terminal 46 is also connected to grounded by-pass capacitor 50.

Between control grid 14 of vacuum tube 10 and transformer secondary terminal 30 there is connected neutralizing capacitor 52. Connected across transformer terminals 22 and 30 is damping resistor 53. The capacitance to ground of anode 20 plus distributed capacitance of wiring is shown as capacitor 55.

As a rule, tubes 10 and 11 may be parts of a dual purpose tube. Referring to Figure 3, there is shown a practical embodiment of damping resistor 53 and transformer 23. Damping resistor 53 (the value of which will be discussed later) is conventional and has cylindrical body *53a*. Wound over body *53a* are windings 22 and 28. Primary 22 will have more turns than secondary 28. The coupling between the two windings must be close and preferably should be as near unity as possible. This may be readily obtained by having the two windings in bifilar relationship with the windings connected in series. As indicated in Figures 3 and *3a*, the extra turns in primary 22 which are not in bifilar relation occur at the end of the winding containing terminal 21. The series connections of the two windings result in the inductances of the windings being in additive relation.

Assuming that the input and output impedances 16 and 48 are tuned to select a desired channel, the equivalent circuits will be as illustrated in Figures *2a* and *2b*. For low frequency channels 2 to 6, the two transformer windings, symbolically designated as $L_1$ and $L_2$ are effectively connected in series aiding relation. Hence the mutual inductance M will be a factor and in accordance with well known theory of coupled circuits, the total inductance is the sum of the individual inductances plus twice the mutual. Tube capacitances 55 and 33 are connected at the two ends of the equivalent inductance. The equivalent circuit extends between anode 20 and cathode 31. In discussing the above equivalent circuit, the effects of network damping and neutralization are disregarded.

Referring to Figure *2a*, the circuit low frequency resonance is not significantly affected by coupling capacitor 26 which has a high impedance for the low band frequencies for the reason that capacitor 26 is connected at or near the zero potential point of the equivalent inductance $L_1$ plus $L_2$ plus 2M. This low frequency equivalent circuit provides a PI type network. This network is shunt tuned by tube capacitances 55 and 33 connected in series. In practice, tube capacitance 33 will be about three times as great as tube capacitance 55. The circuit low frequency resonance occurs at or near channel 6. Below channel 6, the plate of tube 10 faces a predominantly inductive reactance and because of this there will be a slight tendency for regenerative feedback in tube 10 to occur in channels 2 to 5 inclusive. Such positive feedback may be desirable to increase gain on these channels.

On the high band channels 13 to 7 inclusive, the equivalent circuit illustrated in Figure *2b* looks like a PI type network formed by non-bifilar portion of inductance $L_1$, designated as $L_3$, and two capacitances connected in series with each other, and in parallel with this inductance. Tube capacitance 55 is the first capacitance, while coupling capacitor 26 in parallel with the tube capacitance

33 form the second capacitance. The resonant frequency for the high band is at or near channel 13.

A practical embodiment of the circuit embodying the invention was constructed as follows.

Resistor 53 was a one-half watt 4700 ohm resistor having an outer diameter of 5/32 inch. Upon the body of this resistor transformer 23 was wound. Transformer 23 was wound with No. 34 nylon covered copper wire, the windings extending for one-fourth of an inch around the outside of the resistor body. Referring to Figure 3 and looking at the transformer from the left end toward the right end, the turns were wound counter-clockwise. The first six turns consisted of two wires wound in bifilar relation after which primary windings 22 continued on for five more turns. The terminals were cross-connected as illustrated in the wire diagram, Figures 1, 3 and *3a*.

Primary 22 had an inductance of .35 microhenry. Secondary 28 had an inductance of .15 microhenry. The mutual inductance was .14 microhenry. The sum of $L_1$ plus $L_2$ plus 2M was equal to .77 microhenry.

Capacitor 52 had a value of 1 mmf., capacitor 26 had a value of 33 mmf., capacitor 42 had a value of 330 mmf.

Resistor 44 had a value of 820,000 ohms while resistor 45 had a value of 680,000 ohms.

Tubes 10 and 11 were the two parts of a 4BQ7A type of tube. The tube was a standard tube available on the market and the capacitances corresponding to capacitors 55 and 33 were within the rated limits of the tube and in this particular instance happened to be approximately 2 and 6 mmf. respectively. Circuit capacity was further increased by the capacitance of the damping resistor 53 and neutralizing capacitor 52. The damping resistor 53 was used to broaden the response of the low-band resonance.

Tube part 10 had a grid bias resistor of 10,000 ohms within the tuner part 16. The above circuit was used with a switch type tuner available on the market for use with a cascode circuit of conventional design. The two resonance frequencies of the network were co-incident with channels 5 and 12. Without the neutralizing capacitor 52, the resonance frequencies of the network fell on channels 6 and 13. It is possible to shift the resonance frequencies somewhat by adjustment of the two windings of the transformer either by controlling the amount of wire or the spacing of the coils. It was found that a larger value of neutralizing capacitor 52 provided some improvement on channels 5 and 6 but interfered with operation on the channels below 13 in the high band. The neutralizing condenser having the value given was found to work very satisfactorily.

Referring now to the curves, Figure 4 shows a response of a cascode stage without any intertriode peaking network and with the grid of tube 10 and the plate of tube 11 untuned. This curve shows a broad peak in the U.H.F. region which is probably caused by tube and wiring resonances. In this particular setup, anode 20 of tube 10 was metallically connected to cathode 31 of tube 11. It is understood that where necessary a capacitor may be disposed between these two electrodes.

Figures 7 to 12 inclusive show the response of tuner system from tuner input terminals to cathode 31, including the new cascode circuit, on channels 2, 4, 6, 7, 10 and 13, respectively.

The values for circuit parameters were approximate, no attempt having been made to measure them accurately.

Figure 1:
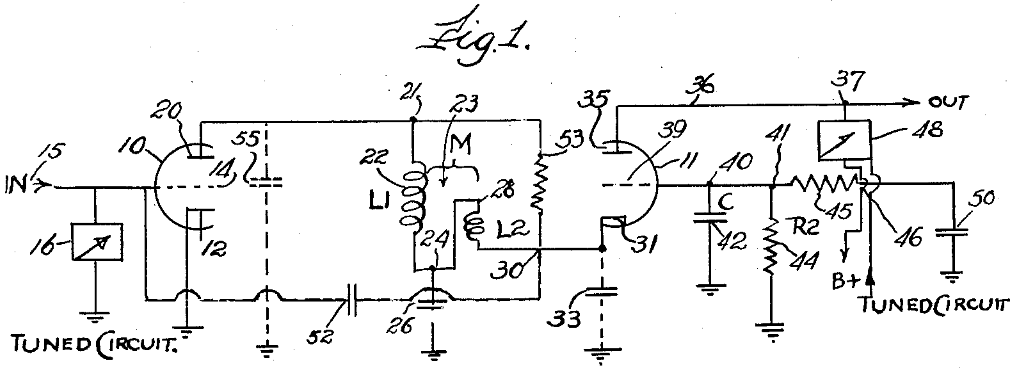
Figure 2A:
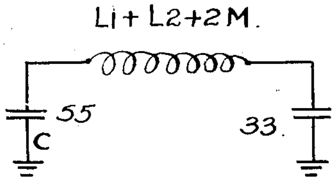
Figure 2B:
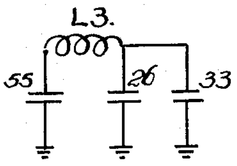
Figure 3:
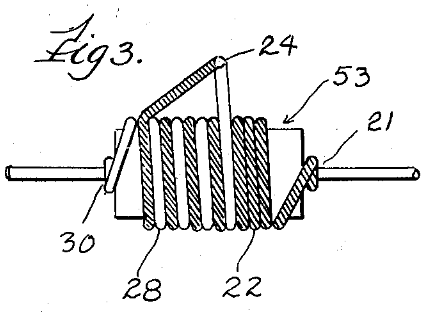
Figure 3A:
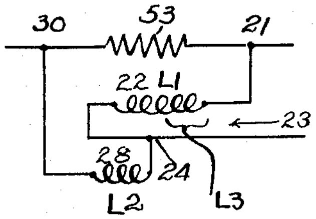
Figure 4:
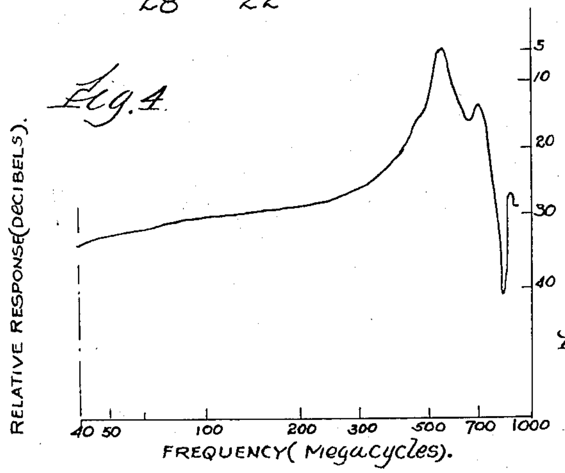
Figure 5:
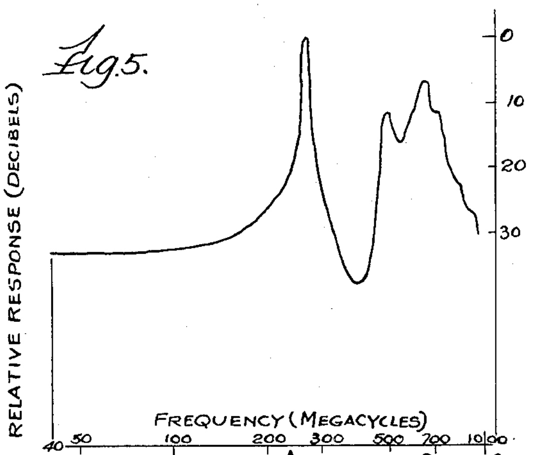
Figure 5 shows a response of the same circuit with a conventional single resonance peaking coil in place of transformer 23.
Figure 6:
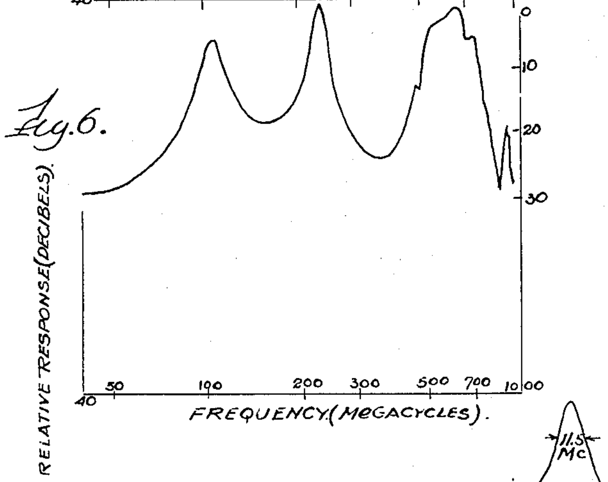
Figure 6 shows a response of the cascode stage with the network illustrated in Figure 1. The effect of two network resonances is clearly visible.
Figures 7, 8:
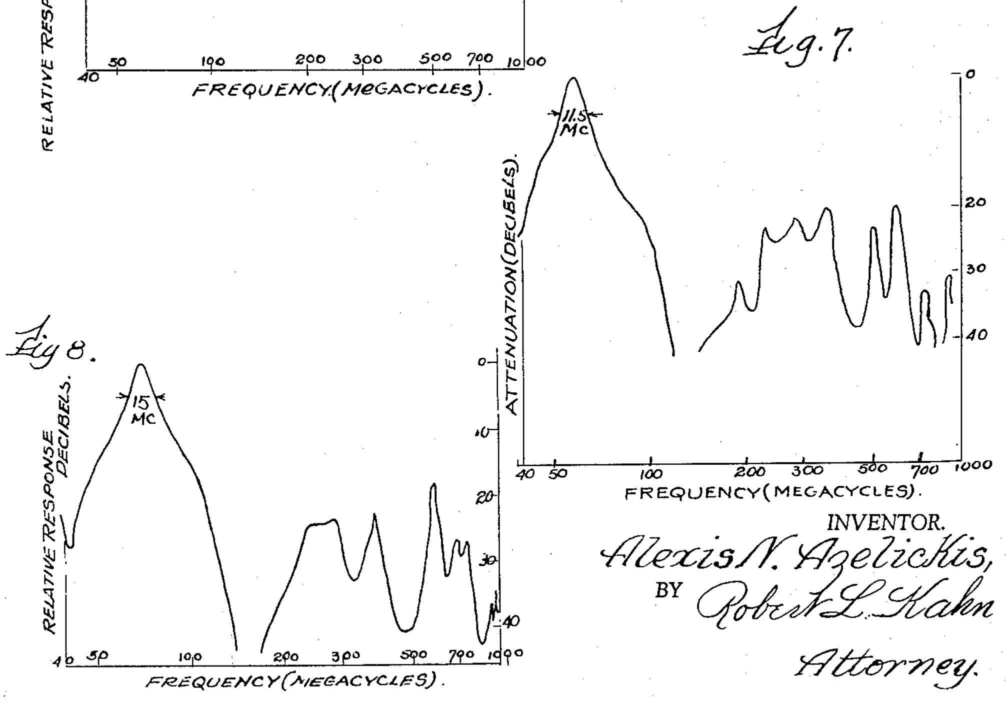
Figures 9, 10, 11, 12:
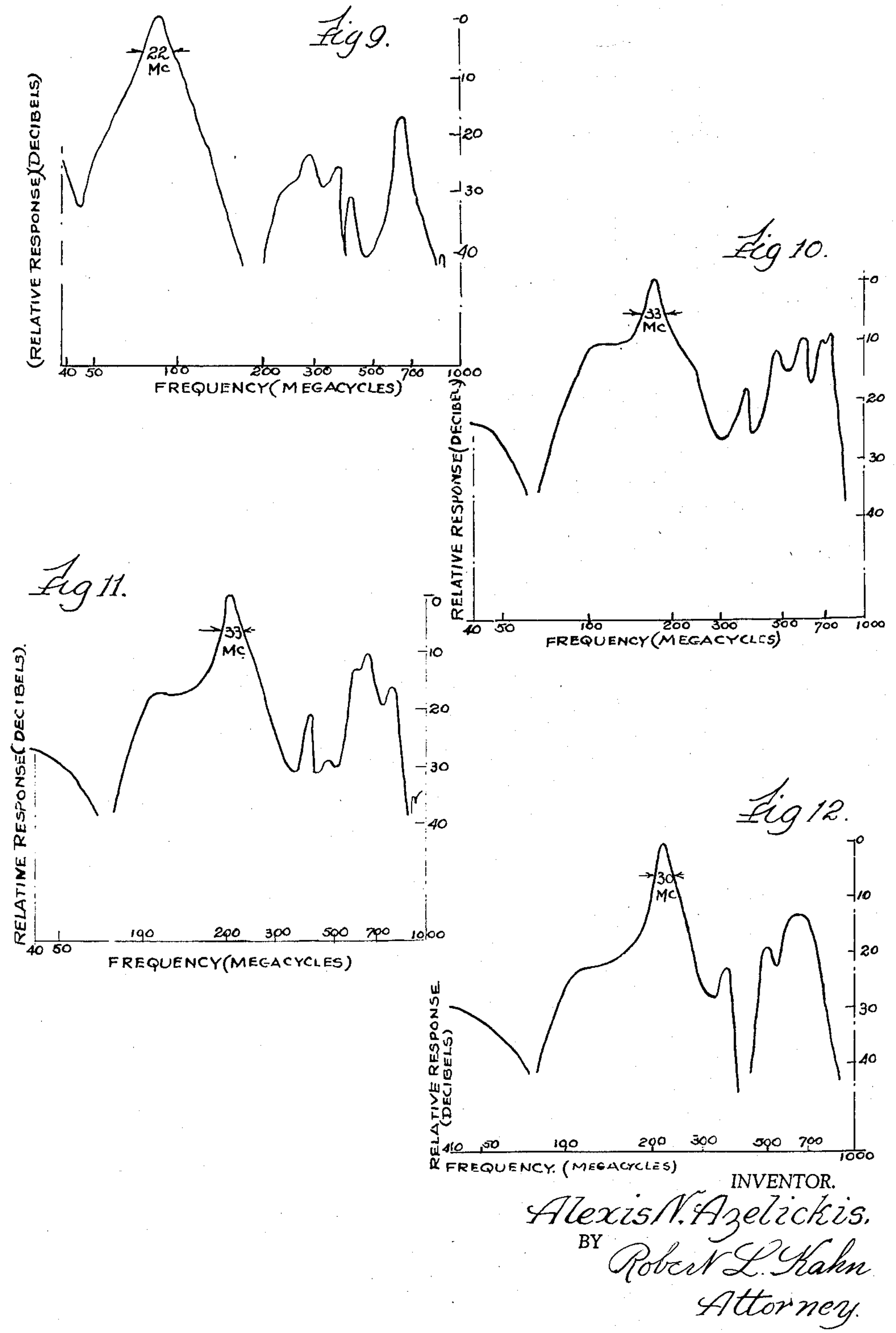

Referring to the various characteristic curves, Figure 4 shows a broad peak response. Figure 5 shows the broad peak response to which has been added a peak due to peaking coil in a conventional tuner system. Figure 6 shows the typical broad peak but adds the bi-resonant peaks at about 110 and about 230 megacycles for the low and high frequencies, respectively. Figure 7 shows a large number of spurious responses in the 250 to 1000 megacycle range and shows the response peak at about 57 megacycles corresponding to channel 2. Figure 8 shows the same general curve but the peak is now at 70 megacycles for channel 4. Figure 9 shows the response for channel 6, the peak being at about 85 megacycles for channel 6. The spurious peaks from 300 megacycles up are still present.

Figure 10 shows the peak at about 175 megacycles for channel 7 and shows the beginning of a peak for channel 6 at about 105 megacycles. Figure 11 is similar to Figure 10 but shows the peak at almost 200 megacycles for channel 10. The channel 6 peak at about 110 megacycles is still present. Figure 12 is similar to Figures 10 and 11 and shows the peak at about 210 megacycles for channel 13 while channel 6 still has a peak at about 125 megacycles.

The new cascode circuit when used with a tuner provides excellent response for the selected channel.

The by-pass resistor across the transformer windings will have a value which will depend on the desired results. If the resistor is omitted or is far too high in value, the sharp resonance curve will have steep sides. Since the overall response of the entire system involves coupled circuits, there will generally be a narrow band with the band top concave to leave twin peaks. This is customary in closely coupled resonant circuits. If the final twin peak response is coincident with the sharp transformer peak (still assuming no by-pass resistor) then there will be little if any tilt to the twin peaks. However, if a different channel is tuned in, the twin peak response of the entire system will be shifted with respect to the sharp transformer single resonance peak. In such case, the steep sides of the single resonance peak will determine the twin peaks of the overall response. This results in a steep tilt of the twin peaks and gives objectionable performance.

It is therefore desirable to have enough resistance across the transformer to broaden the peak of the transformer peak and reduce tilt of response curves of channels to be tuned in. Too low a resistance will reduce gain and is undesirable. Hence the value of the resistance will be determined by overall tuning considerations.

What is claimed is:

In a cascode circuit for TV frequencies comprising channels 2 to 6 inclusive as a low band and channels 7 to 13 inclusive as a high band with the two bands separated by an unused intermediate band, two three-element tubes, each tube having a cathode, control grid and anode, the lower tube in the cascode arrangement having its anode connected to the cathode of the upper tube, the cascode input being to the lower tube across the control grid and cathode thereof, the cascode output being across the anode of the upper tube and cathode of the lower tube, manually tunable means in the input and output of the cascode circuit for selecting a desired TV channel, the connection between the lower tube anode and upper tube cathode consisting of two branches in shunt to each other, one branch having a step-down transformer provided with a primary and a secondary winding connected in series aiding relation, the primary winding being connected between the lower tube anode and a junction point, the secondary winding being connected between the junction point and upper tube cathode, said primary having more turns than the secondary with the two windings being wound in bifilar relation to provide tight coupling, the primary having those turns in excess of the secondary turns free of any bifilar relationship and such excess turns being at that end of the primary which is nearest to the anode of the lower tube, a capacitor connected between said transformer winding junction point and ground, said capacitor having such a capacitance that for frequencies at the low band, the reactance is high enough so that negligible energy is by-passed to ground and the currents at such low band frequencies pass through the primary and secondary windings successively, said capacitor presenting a substantially lower reactance to frequencies in the high band so that currents in the transformer primary are by-passed, said branch containing the transformer windings at low band operation acting as if the inductances due to the primary, secondary and mutual inductance add to provide a resonance peak in the upper part of the low band, said branch containing the transformer windings at high band operation acting as if the only inductance present is that due to the excess non-filar wound turns of the primary to provide a resonance peak in the upper part of the high band, the second branch of the connection between the lower tube anode and upper tube cathode containing a resistor of sufficiently low value to broaden the resonance peaks and reduce tilt of response curves of channels tuned in.

References Cited in the file of this patent

UNITED STATES PATENTS

| | | |
|---|---|---|
| 2,106,226 | Shaper | Jan. 25, 1938 |
| 2,159,944 | Roberts | May 23, 1939 |
| 2,379,168 | McClellan | June 26, 1945 |
| 2,654,058 | McIntosh | Sept. 29, 1953 |
| 2,802,066 | Woll | Aug. 6, 1957 |
| 2,811,590 | Doremus et al. | Oct. 29, 1957 |

OTHER REFERENCES

Electronics, February 1, 1957, pages 170–177, "Portable TV Station for Remote Pickups," by Flory et al.

Electronic Design, August 6, 1958, pages 48, 49, "High Input Impedance Transistor Amplifier," by Montgomery.